(12) United States Patent  
Deng et al.

(10) Patent No.: US 10,957,074 B2  
(45) Date of Patent: Mar. 23, 2021

(54) CALIBRATING CAMERAS USING HUMAN SKELETON

(71) Applicant: Microsoft Technology Licensing, LLC, Redmond, WA (US)

(72) Inventors: Hongli Deng, Bellevue, WA (US); Zicheng Liu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 163 days.

(21) Appl. No.: 16/261,297

(22) Filed: Jan. 29, 2019

(65) Prior Publication Data

US 2020/0242805 A1 Jul. 30, 2020

(51) Int. Cl.  
*G06T 7/80* (2017.01)  
*G06T 7/70* (2017.01)

(52) U.S. Cl.  
CPC . *G06T 7/80* (2017.01); *G06T 7/70* (2017.01)

(58) Field of Classification Search  
CPC .................................. G06T 7/80; G06T 7/70  
See application file for complete search history.

(56) References Cited

U.S. PATENT DOCUMENTS

| | | |
|---|---|---|
| 2012/0327220 A1 | 12/2012 | Ma |
| 2014/0055621 A1 | 2/2014 | Shirani et al. |
| 2014/0072170 A1* | 3/2014 | Zhang ............... G06K 9/00624 382/103 |
| 2015/0079565 A1* | 3/2015 | Miller .................. G09B 23/28 434/252 |
| 2015/0237330 A1 | 8/2015 | Jang |
| 2018/0285697 A1 | 10/2018 | Shotton et al. |
| 2020/0033937 A1* | 1/2020 | Erivantcev ............. G06T 7/97 |
| 2020/0097732 A1* | 3/2020 | Doolittle ............... G06T 7/246 |

FOREIGN PATENT DOCUMENTS

| | | |
|---|---|---|
| CN | 107767424 A | 3/2018 |
| EP | 3166074 A1 | 5/2017 |

OTHER PUBLICATIONS

Zhong Zhang, A Robust Human Detection and Tracking System Using a Human-Model-Based Camera Calibration, VS2008 (Year: 2008).*

(Continued)

*Primary Examiner* — Mark Roz  
(74) *Attorney, Agent, or Firm* — Alleman Hall Creasman & Tuttle LLP

(57) ABSTRACT

Examples are disclosed herein that relate to automatically calibrating cameras based on human detection. One example provides a computing system comprising instructions executable to receive image data comprising depth image data and two-dimensional image data of a space from a camera, detect a person in the space via the image data, determine a skeletal representation for the person via the image data, determine over a period of time a plurality of locations at which a reference point of the skeletal representation is on a ground area in the image data, determine a ground plane of the three-dimensional representation based upon the plurality of locations at which the reference point of the skeletal representation is on the ground area in the image data, and track a location of an object within the space relative to the ground plane.

11 Claims, 10 Drawing Sheets

(56) References Cited

OTHER PUBLICATIONS

Herda et al., "Using Skeleton-Based Tracking to Increase the Reliability of Optical Motion Capture", Human Movement Science, vol. 20, Issue 3, Jun. 20, 2001, pp. 313-341.
Kelly et al., "Pedestrian Detection and Tracking Using Stereo Vision Techniques", http://doras.dcu.ie/109/, Mar. 1, 2008, 263 Pages.
Khan et al., "Consistent Labeling of Tracked Objects in Multiple Cameras with Overlapping Fields of View", In Proceedings of the IEEE Transactions on Pattern Analysis and Machine Intelligence, vol. 25, Issue: 10, Sep. 29, 2003, pp. 1355-1360.
Kurillo et al., "Wide-Area External Multi-Camera Calibration using Vision Graphs and Virtual Calibration Object", In Second ACM/IEEE International Conference on Distributed Smart Cameras, Sep. 7, 2008, 19 Pages.
"International Search Report and Written Opinion Issued in PCT Application No. PCT/US2019/068454", dated May 4, 2020, 17 Pages.
Orrite-Urunuela, et al., "2D Silhouette and 3D Skeletal Models for Human Detection and Tracking", In Proceedings of the 17th International Conference on Pattern Recognition, Aug. 26, 2004, 4 Pages.
Wang, et al., "Intelligent Multi-Camera Video Surveillance: A Review", In Pattern Recognition Letters, vol. 34, No. I, Jan. 3, 2013, pp. 3-19.
Ihrke, et al., "External Camera Calibration for Synchronized Multi-Video Systems", https://graphics.tu-bs.de/upload/people/magnor/publications/wscg04.pdf, Jan. 1, 2004, 8 Pages.
Tianwei, et al., "Graph-Based Consistent Matching for Structure-from-Motion", In International Conference on Financial Cryptography and Data Security, Sep. 17, 2016, 17 Pages.
Cherian, et al., "Accurate 3D Ground Plane Estimation from a Single Image", In Proceedings of the IEEE International Conference on Robotics and Automation, May 12, 2009, 7 Pages.
Chumerin, et al., "Ground Plane Estimation Based on Dense Stereo Disparity", In Proceedings of the Fifth International Conference on Neural Networks and Artificial Intelligence, May 27, 2008, 5 Pages.
Jiang, et al., "4D Tracking", In application as Filed in U.S. Appl. No. 15/974370, dated May 8, 2018, 62 Pages.
Kasten, et al., "Fundamental Matrices from Moving Objects Using Line Motion Barcodes", In Proceedings of the 14th European Conference on Computer Vision, Oct. 11, 2016, pp. 220-228.
Kundu, et al., "Object Pose Estimation from Monocular Image using Multi-View Keypoint Correspondence", In Journal of Computing Research Repository, Sep. 1, 2018, pp. 1-16.
Mehta, et al., "VNect: Real-time 3D Human Pose Estimation with a Single RGB Camera", In Journal of the ACM Transactions on Graphics, vol. 36, Issue 4, Jul. 20, 2017, 15 Pages.
Puwein, et al., "Joint Camera Pose Estimation and 3D Human Pose Estimation in a Multi-Camera Setup", In Proceedings of the 12th Asian Conference on Computer Vision Computer Vision, Nov. 1, 2014, pp. 1-15.
Rovira, Adria Perez., "3D Understanding by Ground Plane Estimation Based on Virtual Camera Motion", In Journal of Frontiers in Artificial Intelligence and Applications, vol. 163, Nov. 20, 2018, pp. 1-21.

\* cited by examiner

|    | 1 | 2 | 3 | 4 | 5 | 6 | 7 | 8 | 9 | 10 | 11 | 12 |
|----|---|---|---|---|---|---|---|---|---|----|----|----|
| 1  |   | X | X | X |   |   | X |   | X |    | X  | X  |
| 2  |   |   |   | X | X | X | X | X | X |    | X  |    |
| 3  |   |   |   |   | X | X | X | X | X |    | X  |    |
| 4  |   |   |   |   |   |   |   |   | X |    | X  | X  |
| 5  |   |   |   |   |   | X | X | X |   |    |    |    |
| 6  |   |   |   |   |   |   | X | X |   |    |    |    |
| 7  |   |   |   |   |   |   |   | X |   |    |    |    |
| 8  |   |   |   |   |   |   |   |   |   |    |    |    |
| 9  |   |   |   |   |   |   |   |   |   |    | X  | X  |
| 10 |   |   |   |   |   |   |   |   |   |    | X  | X  |
| 11 |   |   |   |   |   |   |   |   |   |    |    | X  |
| 12 |   |   |   |   |   |   |   |   |   |    |    |    |

FIG. 9A

902 — RECEIVE IMAGE DATA FROM EACH OF ONE OR MORE CAMERA PAIRS

904 — FOR EACH CAMERA PAIR

906 — RECEIVE A FIRST IMAGE FROM A FIRST CAMERA AND A SECOND IMAGE FROM A SECOND CAMERA

908 — DETECT A PERSON IN THE FIRST IMAGE AND DETECT THE PERSON IN THE SECOND IMAGE IN A REGION WITHIN THE OVERLAPPING FIELDS OF VIEW

910 — DETERMINE A GEOMETRIC RELATIONSHIP BETWEEN THE CAMERAS OF THE CAMERA PAIR BASED UPON COMPARING A LOCATION OF THE PERSON IN THE FIRST IMAGE AND A LOCATION OF THE PERSON IN THE SECOND IMAGE

912 — COMPARE BASED ON SKELETAL REPRESENTATION OF THE PERSON IN THE FIRST IMAGE AND A SKELETAL REPRESENTATION OF THE PERSON IN THE SECOND IMAGE FROM THE DEPTH IMAGE DATA

914 — DETERMINE A CAMERA CONNECTION GRAPH BASED ON THE GEOMETRIC RELATIONSHIPS BETWEEN THE CAMERAS OF THE CAMERA PAIRS

916 — DETERMINE A VISUAL OVERLAP MATRIX FOR THE PLURALITY OF CAMERAS

918 — DETERMINE A PAIRWISE CONNECTION COST FOR EACH OF THE ONE OR MORE CAMERA PAIRS IN MATRIX

920 — DETERMINE THE CAMERA CONNECTION GRAPH BASED ON THE PAIRWISE CONNECTION COSTS

922 — IDENTIFY ONE OR MORE SUBGRAPHS OF THE CAMERA CONNECTION GRAPH BASED UPON THE PAIRWISE CONNECTION COSTS

TO FIG. 9B

CALIBRATING CAMERAS USING HUMAN SKELETON

BACKGROUND

A camera system comprising multiple cameras may be used to observe an area from different perspectives. For example, a retail business may position multiple cameras throughout a store for security and/or customer shopping analysis.

SUMMARY

Examples are disclosed that relate to automatically calibrating cameras based on human skeleton detection. One example provides a computing system comprising instructions executable to receive image data comprising depth image data and two-dimensional image data of a space from a camera, detect a person in the space via the image data, determine a skeletal representation for the person via the image data, determine over a period of time a plurality of locations at which a reference point of the skeletal representation is on a ground area in the image data, determine a ground plane of the three-dimensional representation based upon the plurality of locations at which the reference point of the skeletal representation is on the ground area in the image data, and track a location of an object within the space relative to the ground plane.

Another example provides a computing system comprising instructions executable to receive a first image from a first camera and a second image from a second camera having an overlapping field of view with the first camera, detect a skeleton location of a person in the first image and detect the skeleton location of the person in the second image in a region of each image at which fields of view of the first camera and the second camera overlap, determine a geometric relationship between the cameras of the camera pair based upon comparing coordinates of the skeleton location of the person in the first camera and coordinates of the skeleton location of the person in the second camera, determine a camera connection graph based on the geometric relationships between the cameras of the camera pairs, determine a primary camera from the camera connection graph, determine coordinate mappings defining a spatial relationship between the primary camera and each of one or more other cameras of the plurality of cameras, and track an object that moves between fields of view of two or more cameras of the plurality of cameras based upon the coordinate mappings Another example provides a method of tracking an object viewable by a pair of stationary cameras having an overlapping field of view, the method comprising receiving, from a first camera of a camera pair, first image data comprising first depth image data and first two-dimensional image data, receiving, from a second camera of the camera pair, second image data comprising second depth image data and second two-dimensional image data, detecting a person in the first image data and detecting the person in the second image data in a spatial region at which fields of view of the first camera and the second camera overlap, comparing a first skeletal representation of the person from the first depth data to a second skeletal representation of the person from the second depth data to determine a correspondence between the first skeletal representation and the second skeletal representation, based upon the correspondence from skeleton mapping, detecting visual features in the first two-dimensional image data and the visual features in the second two-dimensional image data, and building one or more additional correspondences using the visual features, determining coordinate mappings that relate a coordinate system of the first camera and a coordinate system of the second camera by using the new correspondence from visual features, and tracking an object that moves between fields of view of the first camera and the second camera based upon the coordinate mappings. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, multiple cameras may be deployed in an area to monitor the area, such as for surveillance purposes (e.g. security and/or customer analytics), for gaming scenarios to track users in a gaming space, and/or various other purposes. Such cameras connected as a camera network may work together to monitor the location and generate information via analysis of image data, including two-dimensional image data and/or depth image data, from the cameras. The use of multiple cameras may provide the benefits of monitoring a wider area, having fewer occlusions of imaging targets (e.g. people in the area), and providing extended and different views of targets and the area.

For the cameras to work as an integrated unit, having an understanding of the scene structure and overall layout of the camera network may be helpful, for example, to provide global spatial awareness, associate targets in different camera views, reduce ambiguities in target detection and tracking, etc. Current methods for spatially calibrating a plurality of cameras relative to one another may involve presenting a calibration pattern in locations at which cameras have overlapping fields of view. Such a process may be time-consuming in a location with multiple spatially distributed cameras. Further, a camera may move or vibrate throughout its lifetime, which may change a spatial relationship of the field of view of the camera relative to other cameras in the location and necessitate a time-consuming recalibration process.

Accordingly, examples are disclosed that relate to automatically calibrating cameras based on human detection. Briefly, a depth sensor and/or two-dimensional image sensor of a camera may be used to detect a human in the location, and a skeletal representation of the detected human may be determined for use in various calibration processes. For example, a ground plane of the area may be identified by detecting locations at which a representative node of the skeleton is on a ground area in the image data over time (e.g. representing where a foot strikes the ground while the user is walking). Further, camera transformation matrices that spatially relate coordinate systems of pairs of cameras of a multi-camera system may be computed by comparing images of a same person captured by cameras having overlapping fields of view. In some examples, both depth image data and two-dimensional image data (e.g. RGB data or grayscale data) may be used for the spatial calibration of cameras relative to one another. The disclosed calibration methods may be implemented automatically during normal camera operation and thus may allow initial calibration and recalibration to be easily performed without disrupting ordinary camera operation.

Figure 1:
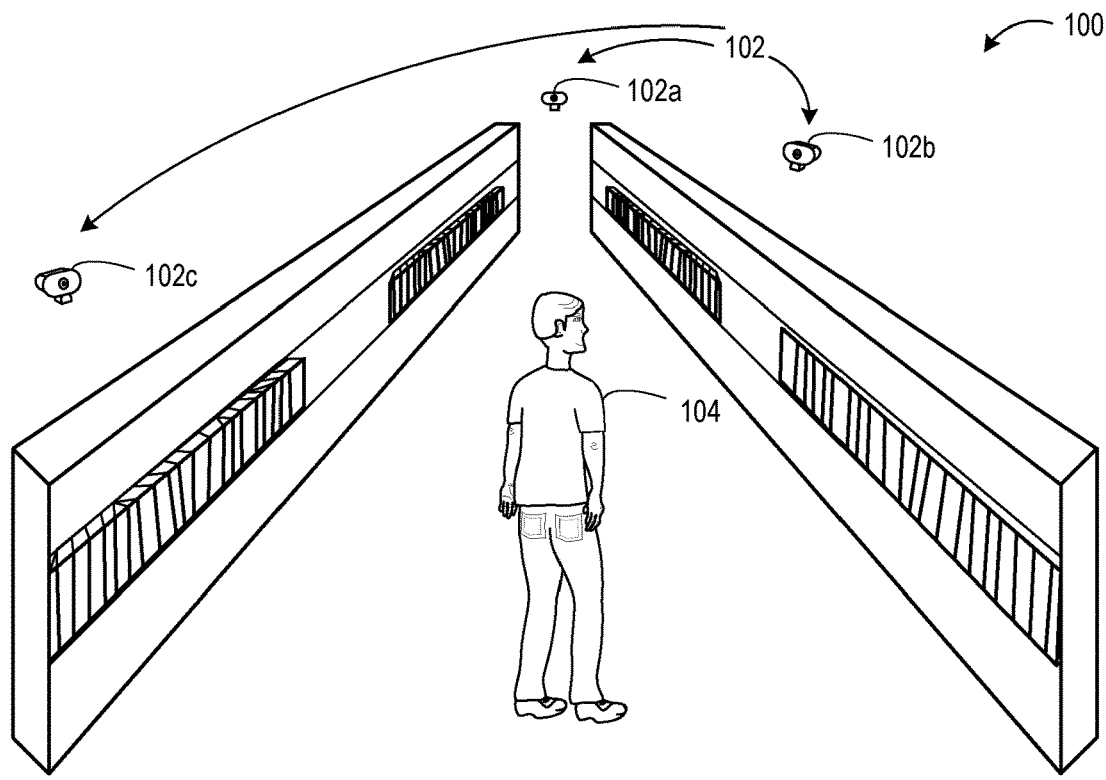
FIG. 1 shows an example use scenario in which multiple cameras of a camera system are imaging an area.
Figure 2:
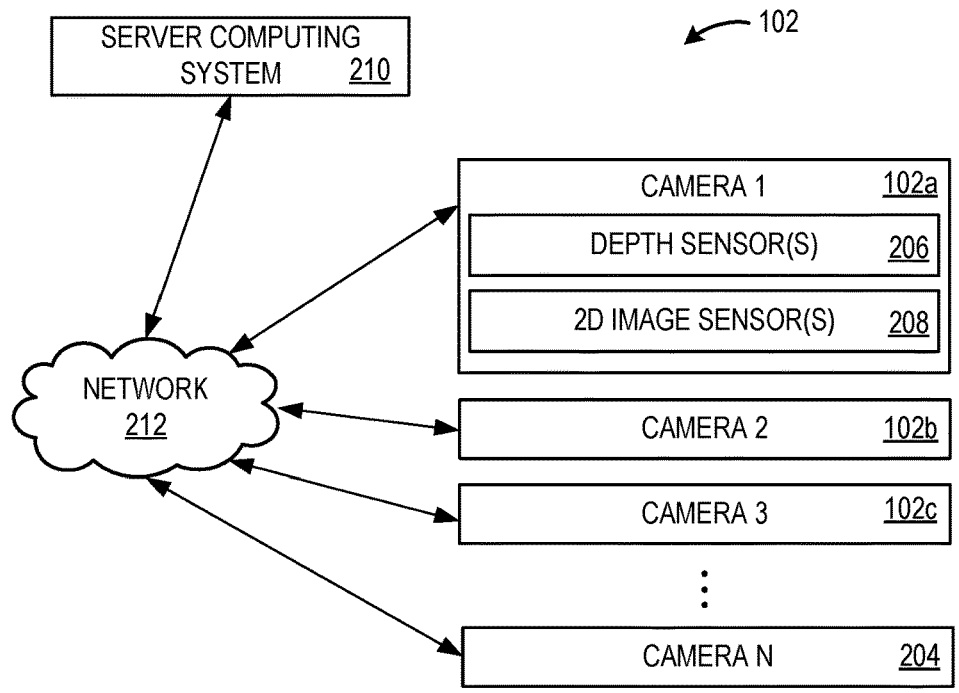
FIG. 2 schematically shows a block diagram of the camera system of FIG. 1.

FIG. 1 shows an example camera system 102 comprising cameras 102a, 102b and 102c. In this example, the cameras are deployed in a retail store environment. However, multi-camera systems may be used in any suitable use environment. Other cameras not shown in FIG. 1 may also be included in the multi-camera system 102, e.g. to image different aisles, a checkout area, a stockroom, outside areas, etc. Each of cameras 102a, 102b and 102c may include one or more depth sensors (e.g. time-of-flight and/or structured light cameras) and/or one or more two-dimensional image sensors (e.g. visible light/RGB image sensors, grayscale image sensors, infrared image sensors). FIG. 2 schematically shows a block diagram of multi-camera system 102 having a plurality of cameras labeled as camera 1 102a, camera 2 102b, camera 3 102c, through camera N 204 each having one or more depth sensor(s) 206 and one or more two-dimensional image sensor(s) 208. Each camera in the multi-camera system 200 may be connected to a server computing system 210 via a wired or wireless network connection 212. The server computing system 210 may be configured to manage the camera system, e.g. turn cameras on/off, control camera movement where applicable, receive and store image data from each camera, calibrate the cameras as described herein, and/or perform any other suitable camera system management. The server computing system 210 may be local to the camera system, remote from the camera system (e.g. implemented as a network-accessible service), or distributed between local and remote devices.

In the example of FIG. 1, person 104 is within the fields of view of cameras 102a, 102b, and 102c. Each of these cameras may include depth sensing technology configured to output a skeletal representation of the person as determined from acquired depth images, in which a person is represented by a model comprising a collection of nodes that represent locations of the human body and that are connected in a form that approximates the form of the human body. As another example, a skeletal representation of the person may first be determined from two-dimensional image data, where points of the skeletal representation in the two-dimensional image data may then be mapped to three-dimensional (3D) points using depth image information.

Figure 3C:
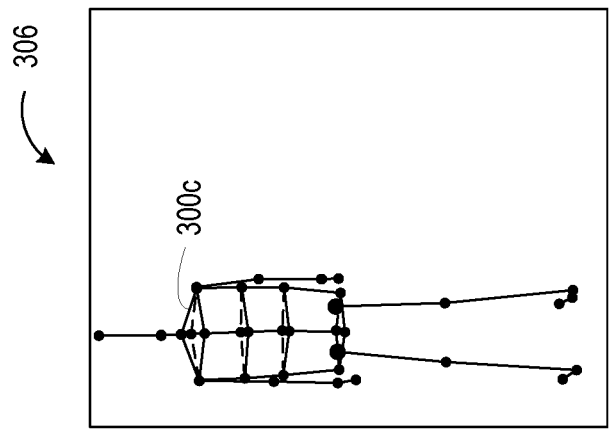
FIGS. 3A-C show example skeletal representations of a person as determined from the perspectives of the cameras in FIG. 1.
Figure 3B:
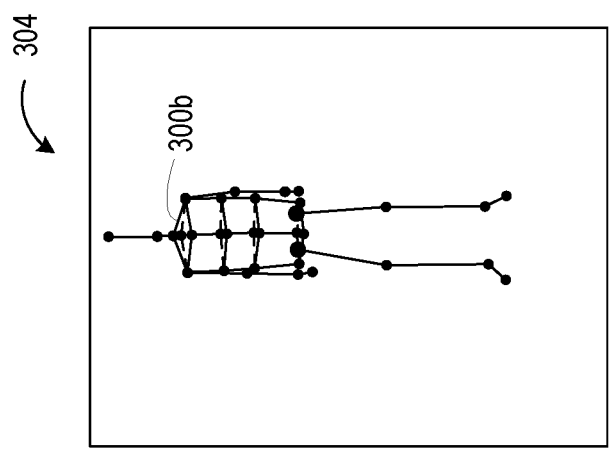
Figure 3A:
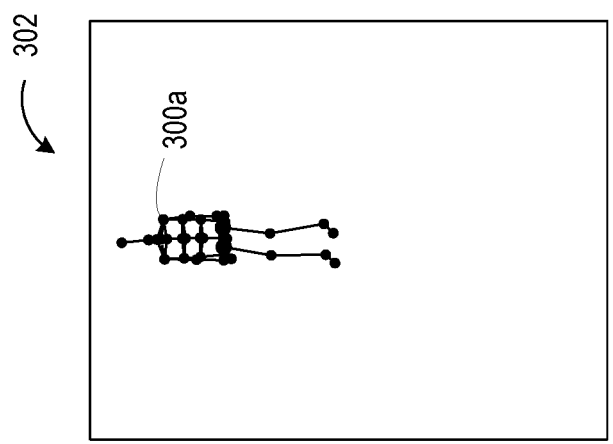

FIGS. 3A-C shows example skeletal representations 300a, 300b, and 300c of the person 104 in FIG. 1 as determined from image data acquired by each of cameras 102a, 102b and 102c, respectively. Such skeletal representations may be computed onboard each camera and provided as camera output, or may be determined by another computing device (e.g. a camera system server) that receives image data from the cameras. The skeletal representations may be used for various calibration tasks. For example, as mentioned above, the skeletal representations may be used to determine a location of a ground plane in an area imaged by the cameras. In a camera system comprising depth image sensors, the depth image sensors may be used to form a depth map of an imaged area. Such a depth map may take the form of a surface reconstruction mesh computed based upon depth values at each pixel in a depth image. Various locations in the surface reconstruction mesh, such as a ground plane, may be identified, semantically labeled (e.g. describing the surface as a wall, floor/ground, table, etc.) and represented as a smooth plane in place of the mesh. However, determining which surfaces in the surface reconstruction mesh correspond to the ground plane may pose challenges, as the manual identification of a ground plane may require the labeling of a relatively large number of ground points in the depth data, which may be time-consuming. Where an insufficient number of ground points are identified, other surfaces and objects in the area may be mistaken for the ground.

Thus, a skeletal representation of a human detected in the image data may be tracked as it moves through the imaged area to identify locations at which a reference point of the skeletal representation is determined to be on a ground area over time to thereby identify ground points. The reference point may be a relatively low node of the skeletal representation (e.g. a node that is close to the physical floor or ground). Depending upon the skeletal model being used, examples of suitable reference points may include an ankle or foot node, a midpoint between left and right foot nodes, or a midpoint between left and right ankle nodes. The locations of the reference point of the skeletal representation over time may then be considered as ground points. These ground points may be determined from a skeletal representation obtained from either two-dimensional image data or depth image data.

Figure 4:
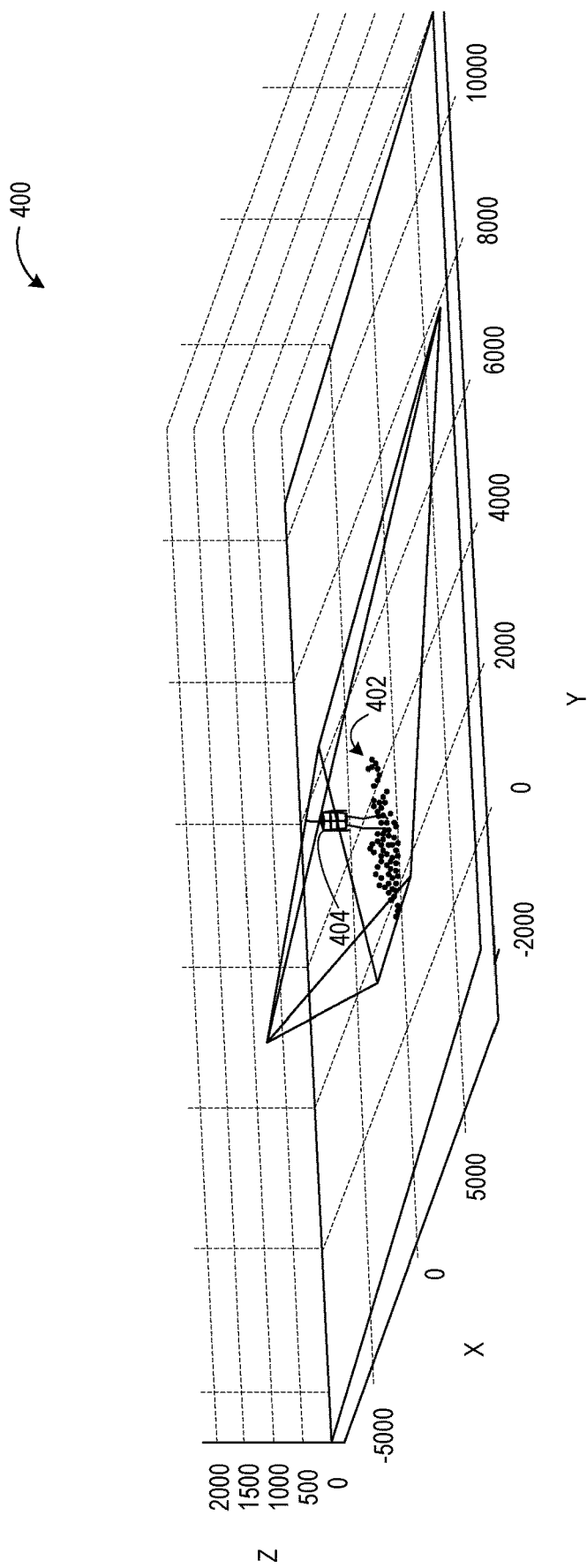
FIG. 4 shows a plot of an example set of ground points identified from locations at which a reference point of a skeletal representation is on a ground area in image data over time.
Figure 5:
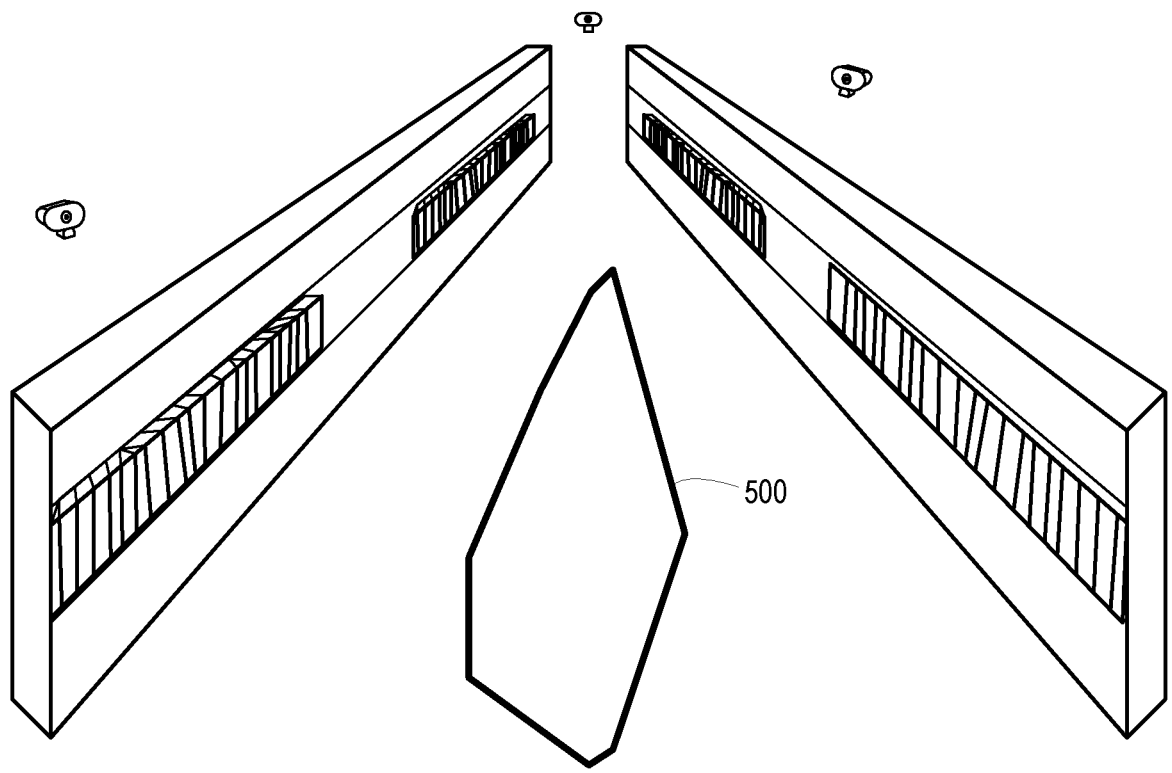
FIG. 5 shows an example ground plane determined based upon the set of ground points of FIG. 4.

FIG. 4 shows a diagram of an example set of ground points 402 in which each ground point represents a location of a reference point of a skeletal representation 404 over time as the corresponding person walked through the area. Upon detecting a sufficient number of ground points in the image data, a convex hull may be fit to the ground points in the image data, for example, using an algorithm such as the quickhull algorithm. Points within the convex hull, which include the ground points and other points, are then mapped to a 3D representation of the area as determined from depth image data. The result of mapping the ground points to the 3D representation is a point cloud of 3D points, and this point cloud may then be used to determine the ground plane. The use of all points within the convex hull in the image form a bigger point set than the set of ground points alone, and their corresponding three-dimensional representations form a bigger point cloud, which may make the ground plane fitting more accurate. FIG. 5 shows an example convex hull 500 fit to the point cloud comprising the set of ground points 402. The convex hull 500 determined and the resulting point cloud of 3D points within the convex hull may be used to estimate a location of the ground plane with respect to the cameras. Thus, by observing the movement of a human within the area and the interactions of an ankle/foot/other reference node of the human with surfaces in the area as determined from depth images, the ground plane may be more easily determined compared to other ground plane detection methods.

Human detection may also be used to determine the spatial relationships among cameras in the camera system 102. Referring briefly back to FIGS. 3A-3C, person 104 is in the fields-of-view 302, 304 and 306 of cameras 102a, 102b and 102c respectively while standing in the location shown in FIG. 1, as these cameras have at least partially overlapping fields of view. Based on imaging the person at the same location from different perspectives, a camera coordinate transformation matrix may be determined for each pair of cameras in FIG. 1 (e.g. cameras 102a/102b, 102a/102c, and 102b/102c). By performing similar imaging and computations for other camera pairs (not shown) in the area with overlapping fields of view, spatial relationships between multiple cameras may be calibrated.

Figures 6, 7:
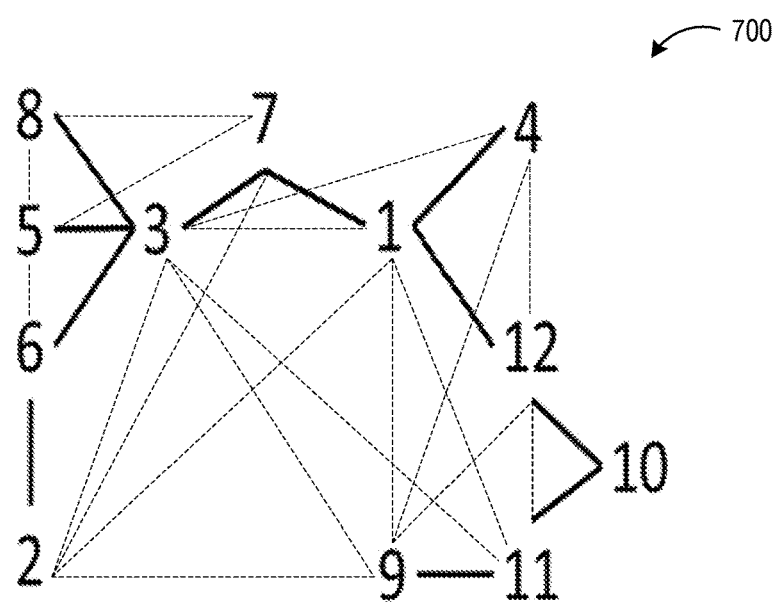
FIG. 6 shows an example visual overlap matrix indicating camera pairs having overlapping fields of view.
FIG. 7 shows an example of a camera connection graph, and illustrates a result of performing a minimum spanning tree algorithm on the camera connection graph.

Any suitable method may be used to spatially calibrate a plurality of cameras of a multi-camera system. In one example, a visual overlap matrix may be determined for the camera system, wherein the visual overlap matrix represents pairs of cameras that have overlapping fields of view. FIG. 6 shows an example visual overlap matrix 600 determined for a camera system having twelve cameras total. Each "X" in the visual overlap matrix 600 indicates that the cameras represented by the intersecting row and column have overlapping fields of view, as determined from a skeletal representation of a same person being imaged in the views of both cameras of the camera pair at a substantially similar time. Only a top half of the matrix is populated in this example to avoid redundancy.

Next, a camera connection graph relating each camera to other cameras in the camera system may be constructed based upon the visual overlap matrix and a connection cost matrix. For example, for each pair of cameras in the visual overlap matrix that have overlapping fields of view, a skeletal representation of a person detected in a first image (from camera 1) may be compared to the skeletal representation of the person detected in a second image (from camera 2) to determine a pairwise connection cost of the camera pair of camera 1 and camera 2. This pairwise connection cost may be calculated from a root mean squared error of distances between the skeletal representation in one camera and the transformed skeletal representation from the other camera. The transformation may be obtained via a 3D rigid transformation algorithm which is used to determine a transformation matrix that relates the coordinate frames of the two cameras based upon corresponding skeletal points of the skeletal representation identified in both images received from the camera pair. The rigid transformation may be fit using one or more linear fitting algorithms, RANSAC algorithms, and/or other suitable algorithms. Pairwise connection costs may be determined in the same manner for each of the camera pairs in the visual overlap matrix 600 with overlapping fields of view.

After determining the pairwise connection costs for each camera pair having overlapping fields of view, the pairwise connection costs are used as edges in the camera connection graph. FIG. 7 shows an example camera connection graph 700, with the connections between overlapping cameras shown both in solid and dashed lines. The camera connection graph 700 may be used to identify one or more "primary cameras" in the camera system, for example, by applying a minimum spanning tree algorithm to determine the lowest-cost connections. The resulting graph may be referred to as an "optimized" camera connection graph, represented in camera graph 700 by the solid lines, wherein the term "optimized" indicates that the graph was processed via the application of a minimum spanning tree algorithm. The term "primary camera" may represent a camera that has a greatest number of connections to other cameras in the optimized camera connection graph, or that meets another metric that represents a spatial relation or amount of overlap of the primary camera to other cameras in the optimized camera connection graph.

In some examples, applying a minimum spanning tree algorithm may result in the production of two or more subgraphs. This may occur naturally in scenarios where one group of cameras does not have any overlapping fields of view with one or more other groups of cameras. As another example, a camera connection graph may be split into two or more subgraphs based on a threshold pairwise connection cost.

In camera connection graph 700, camera 1 and camera 3 may be identified as primary cameras based on these cameras having a greatest degree of overlap with/connections to other cameras in the camera connection graph 700. A primary camera alternatively or additionally may be determined based on other factors, such as pairwise connection costs, an overall optimized connection cost of the camera system, and/or upon any other suitable metrics and characteristics regarding the camera connection graph 700.

Once the primary cameras and subgraphs (if any) are determined, for each primary camera, final coordinate mappings are determined between the primary cameras and each of the other cameras within the appropriate subgraph, e.g. based upon a shortest path algorithm. This mapping then may be used to transform between camera views when tracking movement of a person through the area imaged by the cameras. For example, with regard to camera connection graph 700, cameras 2 and 3 directly overlap, but the edge between cameras 2 and 3 in the camera connection graph 700 is not a part of the optimized graph, as the pairwise connection cost may have been higher than those along the minimum spanning tree. Nevertheless, as the shortest path to transform from the coordinate system of camera 2 to the coordinate system of primary camera 3 is via the edge directly connecting these nodes in the initial camera connection graph 700, this transformation may be used while tracking motion of the person between areas imaged by these cameras. The above described spatial calibration methods may be performed automatically throughout the lifetime of operation of the camera system during ordinary use, without employing manual calibration steps or specially configured optical patterns.

In some examples, ground plane determination as described above may be further taken into consideration to determine the coordinate mappings among cameras. For example, the ground plane may be used to evaluate the accuracy and quality of determined coordinate mappings among cameras, and be used to recalculate or correct the coordinate mappings. In one example, a direction error between a normal vector of the ground plane in one camera and a normal vector of the transformed ground plane in another camera may be used in a RANSAC fitting process to help select a transformation matrix between the two cameras.

When using skeletal representations in depth data to spatially calibrate cameras with overlapping fields of view, the 3D skeletal representations used may provide robust correspondence determinations, in that it may be easy to determine that a skeletal point identified from different cameras correspond to a same 3D point or skeleton node (e.g. a person's left shoulder). However, the skeletal representations also may provide less robust positional accuracy compared to visual features in two-dimensional image data. Two-dimensional image visual features, in contrast, may provide more robust positional accuracy, but less robust correspondence determinations, as it may be difficult to locate a visual feature of an object in two-dimensional images taken from different perspectives of an overlapping field of view. Thus, in some examples, camera mappings may be determined using both depth data and two-dimensional image data. As one example, skeletal representations from depth image data may be used to establish correspondence points between images received from each camera. Then, correspondences between two-dimensional image visual features may be searched in constrained regions based upon the initial camera coordinates mapping calculated from skeleton correspondences. The refined correspondences built from the two-dimensional reference visual features then may be used to determine the camera mapping. In other example, any other suitable imaged object than a person also may be used to provide visual features.

As a more specific example using skeletal models, given a camera pair having overlapping views, correspondence points (e.g. a left shoulder node etc. for each skeleton) of skeletons imaged by each camera within the overlapping field of view may be located, and an initial transformation matrix may be computed with these correspondence points. Based on this initial transformation, the new correspondence points then may be searched using visual reference features in two-dimensional images, such as a pupil, nose, ear, object, etc. These visual features may be difficult to build correspondences when the entire image is searched. However, the known transformation computed from the skeletal representations may allow the search of the two-dimensional image data to be constrained to a region at which the features have less ambiguities in matching. One or more of such corresponding RGB visual features may then be used to appropriately adjust the 3D transformation matrix to more accurately map the relationship of the first camera to the second camera.

Figure 8:
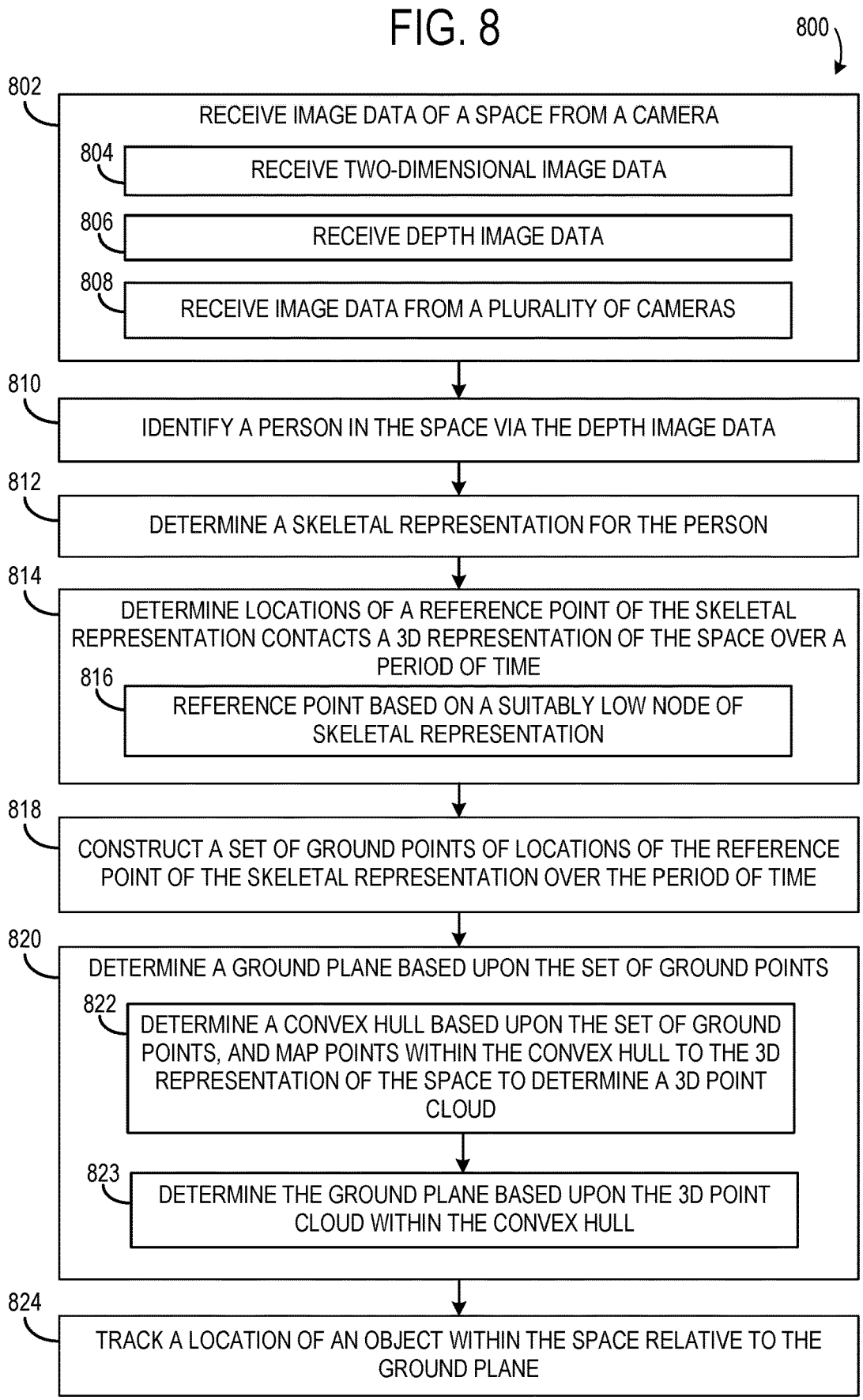
FIG. 8 shows an example method of determining a ground plane using image data.

FIG. 8 shows an example method 800 of determining a ground plane using image data. Method 800 includes, at 802, receiving image data of a space from a camera. The image data may include two-dimensional image data, at 804, and/or depth image data, at 806. In some examples, the image data may be received from a plurality of cameras, at 808. Method 810 further includes, at 810, identifying a person in the space via the depth image data or RGB image data, and at 812, determining a skeletal representation for the person, e.g. via detection algorithms (e.g. one or more neural networks, decision trees, etc.). Method 800 additionally includes, at 814, determining locations of a reference point of the skeletal representation over a period of time. As mentioned above, such a reference point may be based on a suitably low node of the skeletal representation, at 816, such as an ankle or foot node, a midpoint between left and right foot nodes, or a midpoint between left and right ankle nodes, as examples. In some examples, the reference point may correspond to a lowest node.

Method 800 further includes, at 818, constructing a set of ground points of locations of the reference point of the skeletal representation over the period of time. Then, at 820, method 800 comprises determining a ground plane based upon the set of ground points. For example, determining the location of the ground plane may comprise, at 822, determining a convex hull calculated from the set of ground points in two-dimensional images, mapping all the points within the convex hull to the 3D representation of the space to determine a 3D point cloud, and use this enhanced point cloud to fit a ground plane at 823. Method 800 further includes, at 824, tracking a location of an object within the space relative to the ground plane.

Figure 9:
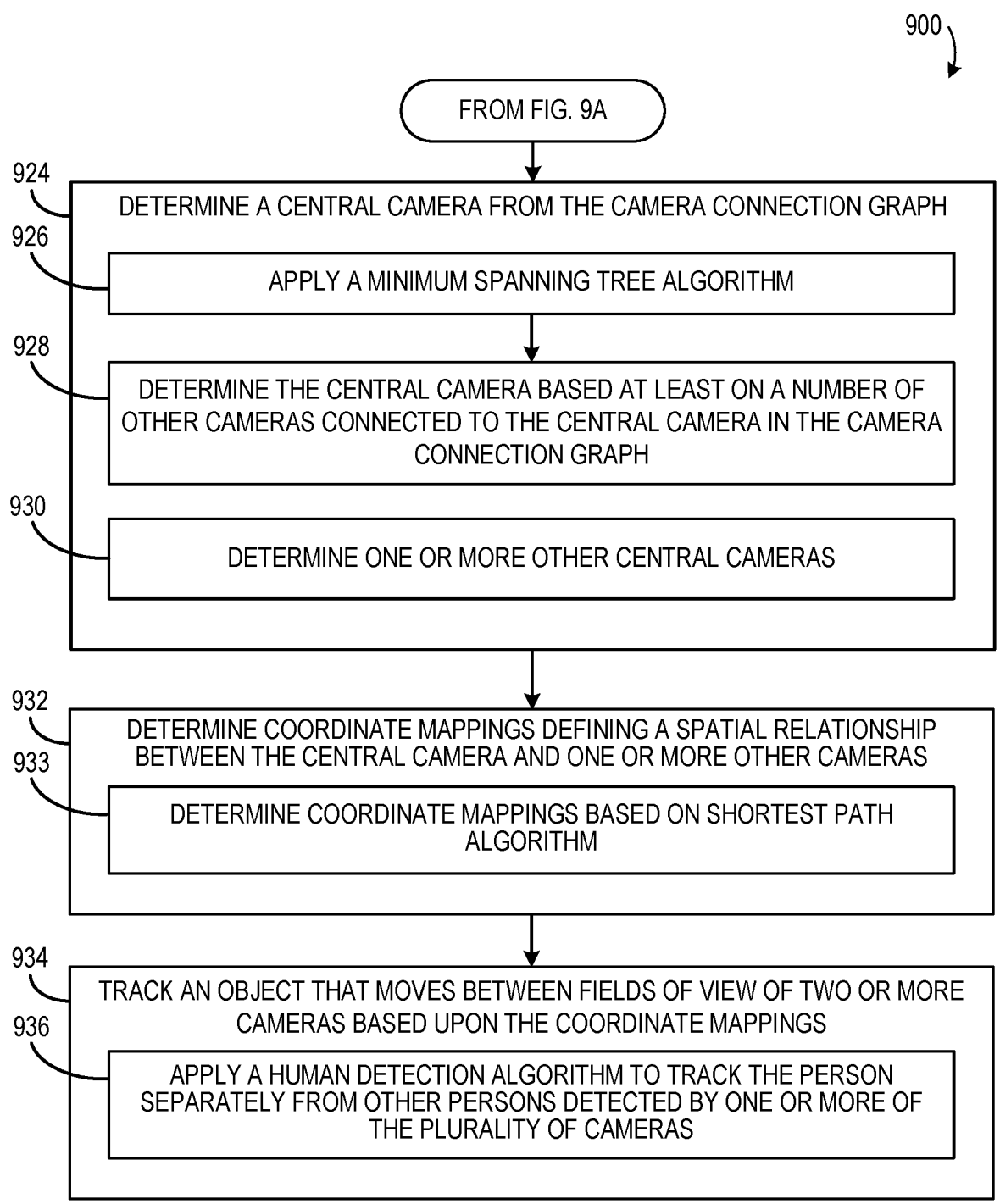
FIGS. 9A-B shows an example method of determining coordinate mappings defining a spatial relationship among a plurality of cameras.

FIGS. 9A-B shows an example method 900 of determining coordinate mappings defining a spatial relationship among a plurality of cameras. Method 900 includes, at 902, receiving image data from a plurality of camera pairs with overlapping fields of view. More particularly, for each camera pair 904, method 900 includes receiving a first image from a first camera and a second image from a second camera, at 906; detecting a person in the first image and detecting the same person in the second image in a region within the overlapping fields of view, at 908; and determining a geometric relationship between the cameras of the camera pair based upon comparing three-dimensional skeleton coordinates of the person in the first image and three-dimensional skeleton coordinates of the person in the second image, at 910. Determining a geometric relationship may comprise, for example, utilizing a 3D rigid transformation algorithm to determine a coordinate transformation matrix based upon correspondence points in the first image and in the second image. This determination may be based on comparing a skeletal representation of the person in the first image and a skeletal representation of the person in the second image from the depth image data directly or from two-dimensional image data and map to three-dimensional space, as shown at 912. In such examples, the correspondence points may be nodes of the skeletal representation. The geometric relationship between two cameras may include a pairwise connection cost based upon the rigid transformation errors, e.g. root mean squared errors. In some examples, the geometric relationship may be computed also based upon comparing reference visual features in two-dimensional image data.

Method 900 further includes, at 914, determining a camera connection graph based on the geometric relationships between the cameras of the camera pairs. First, a visual overlap matrix may be determined for the plurality of cameras, at 916. The camera connection graph may then be determined based on the pairwise connection costs and visual overlap matrix, at 920. Further, at 922, in some examples one or more subgraphs of the camera connection graph may be identified based upon the pairwise connection costs. For example, a camera connection graph may be split into two or more subgraphs based on a threshold pairwise connection cost.

Continuing with FIG. 9B, method 900 further includes, at 924, determining a primary camera from the camera connection graph. Where the camera connection graph is split into subgraphs, the primary camera determination may be performed for each subgraph. In some examples, the primary camera may be determined by applying a minimum spanning tree algorithm, at 926, and determining the primary camera based on at least a number of other cameras connected to the primary camera in the camera connection graph, at 928. Method 900 may also include, at 930, determining one or more other primary cameras.

Next at 932, method 900 includes determining final coordinate mapping between the primary camera and one or more other cameras, for example, using a shortest path algorithm, at 933. Method 900 then includes, at 934, tracking an object (e.g. a person) that moves between fields of view of two or more cameras based upon the coordinate mappings. Method 900 may further include, at 936, applying a human detection algorithm to track a person separately from other persons detected by one or more of the plurality of cameras.

Figure 10:
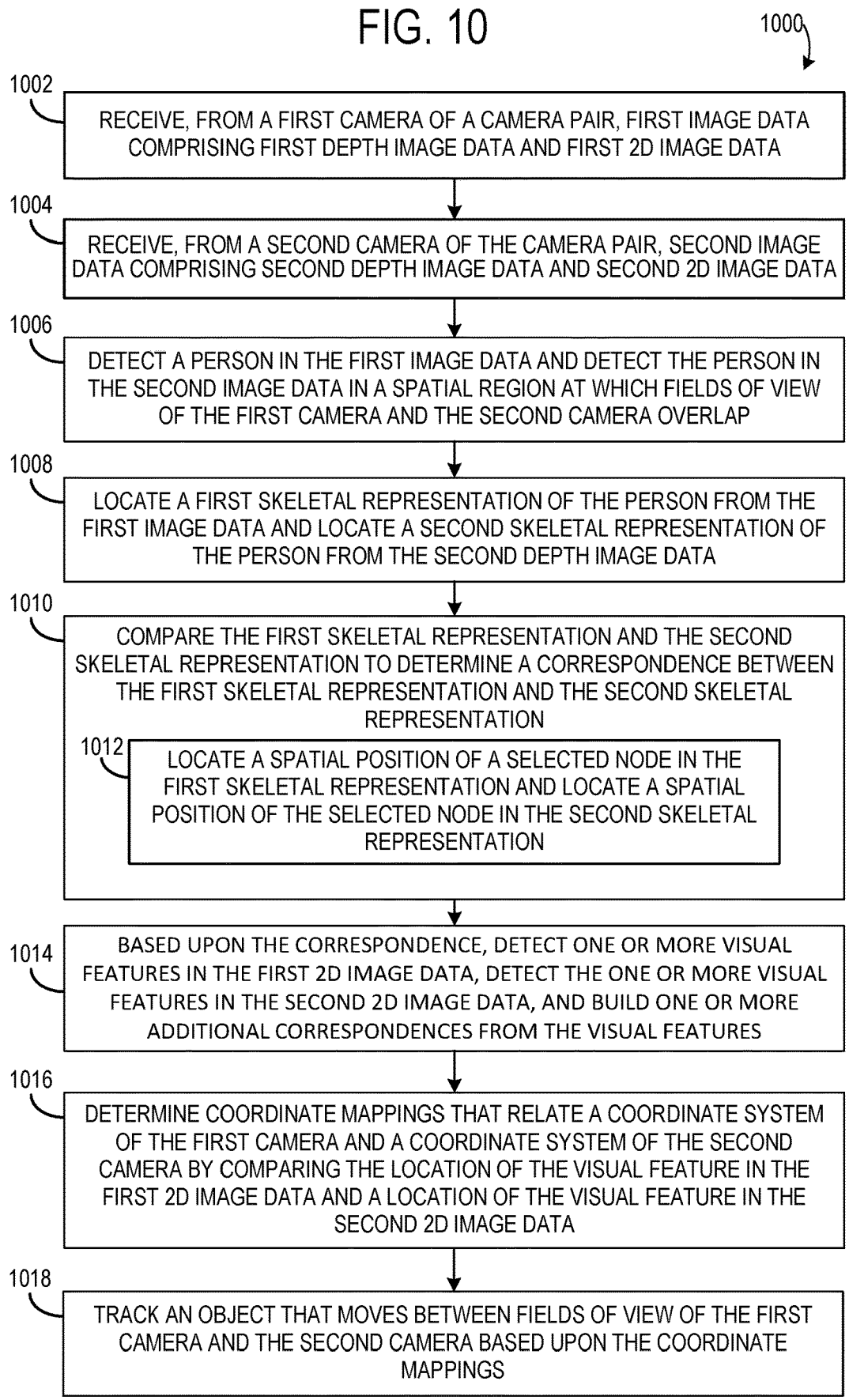
FIG. 10 shows an example method of calibrating a spatial relationship of a pair of cameras having an overlapping field of view.

FIG. 10 shows an example method 1000 of calibrating a spatial relationship of a pair of cameras having an overlapping field of view. Method 1000 includes, at 1002, receiving, from a first camera of a camera pair, first image data comprising first depth image data and first two-dimensional image data, and at 1004, receiving, from a second camera of the camera pair, second image data comprising second depth image data and second two-dimensional image data. Depth image data may be obtained via one or more depth sensors (e.g. time-of-flight and/or structured light cameras), and two-dimensional image data may be obtained via one or more two-dimensional image sensors (e.g. visible light/RGB image sensors, grayscale image sensors, infrared image sensors) of each of the first camera and the second camera.

Method 1000 further includes, at 1006, detecting a person in the first image data and detecting the person in the second image data in a spatial region at which fields of view of the first camera and the second camera overlap, and at 1008, locating a first skeletal representation of the person from the first image data and locating a second skeletal representation of the person from the second depth image data. Skeletal representations may be determined using any suitable classification algorithms, and may be provided as output from a depth imaging system, or two-dimensional (e.g. RGB) imaging system.

Method 1000 further includes, at 1010, comparing the first and the second skeletal representation to determine a correspondence between the first skeletal representation and the second skeletal representation. This may include, for example, at 1012, locating a spatial position of a selected node in the first skeletal representation and locating a spatial position of the selected node in the second skeletal representation. The selected node may represent a same skeletal point in each of the first and second skeletal representations.

Method 1000 next includes, at 1014, based upon the correspondence between the first skeletal representation and the second skeletal representation, locating a visual feature of the person in the first two-dimensional image data and locating the visual feature of the person in the second two-dimensional image data. For example, as mentioned above, skeletal representations may be used to establish correspondence points. The correspondence points may then be used to constrain a search to a region of the two-dimensional image data for a particular visual feature, such as an object within the area, or a person's facial feature such as a nose or eye, e.g. as determined via facial recognition algorithms. The visual feature detected in each of the images may provide robust positional accuracy and be used to determine camera mappings. As such, method 1000 further includes, at 1016, determining coordinate mappings that relate a coordinate system of the first camera and a coordinate system of the second camera by comparing a location of the visual feature in the first two-dimensional image data and a location of the visual feature in the second two-dimensional image data. The coordinate mappings may then help to track an object that moves between fields of view of the first camera and the second camera, as shown at 1018.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
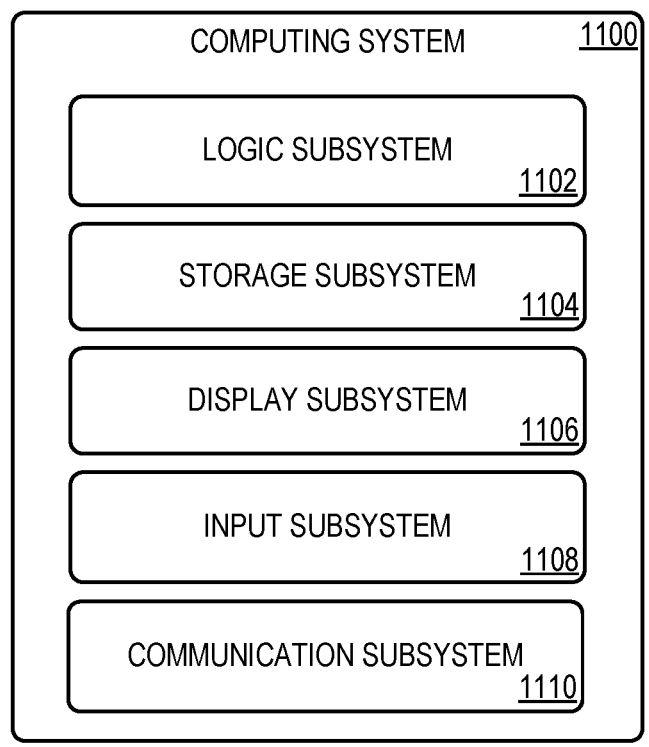
FIG. 11 is a block diagram of an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. Computing system 1100 may be representative of a multi-camera system, a server computing system within the camera network, and/or a camera comprising integrated processing.

Computing system 1100 includes a logic subsystem 1102 and a storage subsystem 1104. Computing system 1100 may optionally include a display subsystem 1106, input subsystem 1108, communication subsystem 1110, and/or other components not shown in FIG. 11.

Logic subsystem 1102 includes one or more physical devices configured to execute instructions. For example, logic subsystem 1102 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1102 may include one or more processors configured to execute software instructions. Additionally or alternatively, logic subsystem 1102 may include one or more hardware or firmware logic machines configured to execute hardware or firmware instructions. Processors of logic subsystem 1102 may be single-core or multi-core, and the instructions executed thereon may be configured for sequential, parallel, and/or distributed processing. Individual components of logic subsystem 1102 optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1104 includes one or more physical devices configured to hold instructions executable by logic subsystem 1102 to implement the methods and processes described herein. When such methods and processes are implemented, the state of storage subsystem 1104 may be transformed—e.g., to hold different data.

Storage subsystem 1104 may include removable and/or built-in devices. Storage subsystem 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 may include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage subsystem 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic subsystem 1102 and/or storage subsystem 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a computing system comprising a processor, and storage comprising instructions executable by the processor to receive image data comprising depth image data and two-dimensional image data of a space from a camera, detect a person in the space via the image data, determine a skeletal representation for the person via the image data, determine over a period of time a plurality of locations at which a reference point of the skeletal representation is on a ground area in the image data, determine a ground plane of the three-dimensional representation based upon the plurality of locations at which the reference point of the skeletal representation is on the ground area in the image data, and track a location of an object within the space relative to the ground plane. The reference point of the skeletal representation may additionally or alternatively be based on a lowest node of the skeletal representation. The instructions may be additionally or alternatively executable to define a convex hull that includes the plurality of locations at which the reference point of the skeletal representation is on the ground area in the image data, map a plurality of points within the convex hull to a three-dimensional representation of the space to form a point cloud, and determine the ground plane based upon the point cloud. The instructions may be additionally or alternatively executable to form the point cloud by mapping a plurality of two-dimensional points within the convex hull as determined from the two-dimensional image data to the three-dimensional representation of the space. The instructions may be additionally or alternatively executable to receive image data from a plurality of cameras and to determine the ground plane based upon the image data from the plurality of cameras. The instructions may be additionally or alternatively executable to spatially calibrate a pair of cameras of the plurality of cameras based at least upon a skeleton position of the person in an image from a first camera of the pair of cameras and the skeleton position of the person in an image from a second camera of the pair of cameras acquired when the person is located in the overlapping field of view. The instructions may be additionally or alternatively executable to spatially calibrate the pair of cameras further based upon the ground plane.

Another example provides a computing system comprising a processor, and storage comprising instructions executable by the processor to receive a first image from a first camera and a second image from a second camera having an overlapping field of view with the first camera, detect a skeleton location of a person in the first image and detect the skeleton location of the person in the second image in a region of each image at which fields of view of the first camera and the second camera overlap, determine a geometric relationship between the cameras of the camera pair based upon comparing coordinates of the skeleton location of the person in the first camera and coordinates of the skeleton location of the person in the second camera, determine a camera connection graph based on the geometric relationships between the cameras of the camera pairs, determine a primary camera from the camera connection graph, determine coordinate mappings defining a spatial relationship between the primary camera and each of one or more other cameras of the plurality of cameras, and track an object that moves between fields of view of two or more cameras of the plurality of cameras based upon the coordinate mappings. The instructions may be additionally or alternatively executable to determine the geometric relationship between the cameras of each camera pair based on comparing a skeletal representation of the person in the first image and a skeletal representation of the person in the second image. The instructions may be additionally or alternatively further executable to determine a pairwise connection cost for each of the one or more camera pairs, and determine the camera connection graph based on the pairwise connection costs. The instructions may be additionally or alternatively executable to determine the pairwise connection cost for each of the one or more camera pairs by applying a 3D rigid transformation matrix using a linear fitting algorithm and/or a RANSAC fitting algorithm. The instructions may be additionally or alternatively executable to determine the camera connection graph by applying a minimum spanning tree algorithm based upon the pairwise connection costs. The instructions may be additionally or alternatively further executable to determine the primary camera based at least on a number of other cameras connected to the primary camera in the camera connection graph. The instructions may be additionally or alternatively further executable to divide the camera connection graph into two or more subgraphs based upon the pairwise connection costs. The instructions are executable to determine the coordinate mappings between the primary camera and each of one or more other cameras of the plurality of cameras by applying a shortest path algorithm. The primary camera may additionally or alternatively be a first primary camera, and wherein the instructions are further executable to determine a second primary camera from the camera connection graph, and determine coordinate mappings defining a spatial relationship between the second primary camera and each of one or more other cameras of the plurality of cameras. The instructions may be additionally or alternatively executable to apply a human detection algorithm to track the person separately from other persons detected by one or more of the plurality of cameras. The instructions may be additionally or alternatively executable to determine a ground plane of the space based on locations at which a reference point of the skeletal representation of the person contacted a three-dimensional representation of the space by combining the ground plane estimation in the plurality of cameras.

Another example provides a method of tracking an object viewable by a pair of stationary cameras having an overlapping field of view, the method comprising receiving, from a first camera of a camera pair, first image data comprising first depth image data and first two-dimensional image data, receiving, from a second camera of the camera pair, second image data comprising second depth image data and second two-dimensional image data, detecting a person in the first image data and detecting the person in the second image data in a spatial region at which fields of view of the first camera and the second camera overlap, comparing a first skeletal representation of the person from the first depth data to a second skeletal representation of the person from the second depth data to determine a correspondence between the first skeletal representation and the second skeletal representation, based upon the correspondence from skeleton mapping, detecting visual features in the first two-dimensional image data and the visual features in the second two-dimensional image data and building one or more additional correspondences using the visual features, determining coordinate mappings that relate a coordinate system of the first camera and a coordinate system of the second camera by using the one or more additional correspondence from visual features, and tracking an object that moves between fields of view of the first camera and the second camera based upon the coordinate mappings. Determining the correspondence between the first skeletal representation and the second skeletal representation may additionally or alternatively include locating a spatial position of a selected node in the first skeletal representation and locating a spatial position of the selected node in the second skeletal representation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor; and
storage comprising instructions executable by the processor to:
receive a first image from a first camera and a second image from a second camera having an overlapping field of view with the first camera,
detect a skeleton location of a person in the first image and detect the skeleton location of the person in the second image in a region of each image at which fields of view of the first camera and the second camera overlap,
determine a geometric relationship between the cameras of the camera pair based upon comparing coordinates of the skeleton location of the person in the first camera and coordinates of the skeleton location of the person in the second camera,
determine a camera connection graph based on the geometric relationships between the cameras of the camera pairs,
determine a primary camera from the camera connection graph,
determine coordinate mappings defining a spatial relationship between the primary camera and each of one or more other cameras of the plurality of cameras, and
track an object that moves between fields of view of two or more cameras of the plurality of cameras based upon the coordinate mappings.

2. The computing system of claim 1, wherein the instructions are executable to determine the geometric relationship between the cameras of each camera pair based on comparing a skeletal representation of the person in the first image and a skeletal representation of the person in the second image.

3. The computing system of claim 1, wherein the instructions are further executable to determine a pairwise connection cost for each of the one or more camera pairs, and determine the camera connection graph based on the pairwise connection costs.

4. The computing system of claim 3, wherein the instructions are executable to determine the pairwise connection cost for each of the one or more camera pairs by applying a 3D rigid transformation matrix using a linear fitting algorithm and/or a RANSAC fitting algorithm.

5. The computing system of claim 3, wherein the instructions are executable to determine the camera connection graph by applying a minimum spanning tree algorithm based upon the pairwise connection costs.

6. The computing system of claim 3, wherein the instructions are further executable to determine the primary camera based at least on a number of other cameras connected to the primary camera in the camera connection graph.

7. The computing system of claim 3, wherein the instructions are further executable to divide the camera connection graph into two or more subgraphs based upon the pairwise connection costs.

8. The computing system of claim 1, wherein the instructions are executable to determine the coordinate mappings between the primary camera and each of one or more other cameras of the plurality of cameras by applying a shortest path algorithm.

9. The computing system of claim 1, wherein the primary camera is a first primary camera, and wherein the instructions are further executable to determine a second primary camera from the camera connection graph, and determine coordinate mappings defining a spatial relationship between the second primary camera and each of one or more other cameras of the plurality of cameras.

10. The computing system of claim 1, wherein the instructions are further executable to apply a human detection algorithm to track the person separately from other persons detected by one or more of the plurality of cameras.

11. The computing system of claim 1, wherein the instructions are further executable to determine a ground plane of the space based on locations at which a reference point of the skeletal representation of the person contacted a three-dimensional representation of the space by combining the ground plane estimation in the plurality of cameras.

* * * * *